June 3, 1930.  J. E. KENNEDY  1,761,130
PRESSURE GAUGE FOR PNEUMATIC TIRES
Filed July 26, 1927
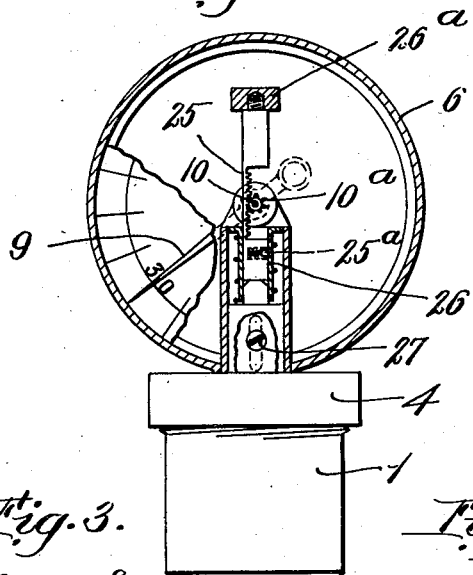
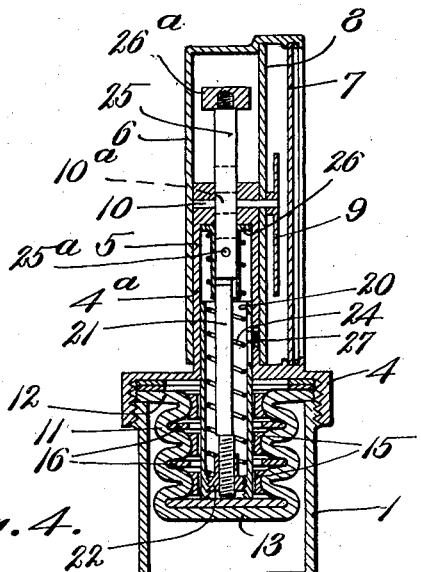
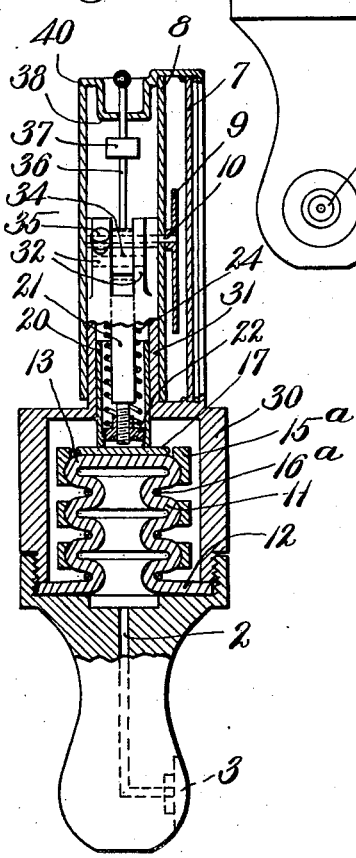
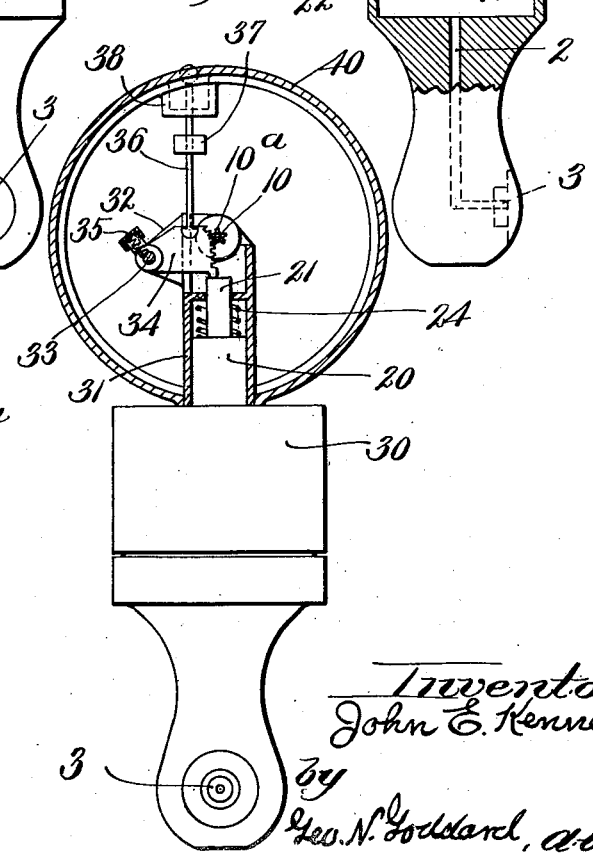
Inventor:
John E. Kennedy
by
Geo. N. Goddard, atty.

Patented June 3, 1930

1,761,130

UNITED STATES PATENT OFFICE

JOHN E. KENNEDY, OF LOS ANGELES, CALIFORNIA

PRESSURE GAUGE FOR PNEUMATIC TIRES

Application filed July 26, 1927. Serial No. 208,435.

This invention relates to pressure gauges particularly adapted to be applied to pneumatic tire stems temporarily for the purpose of testing the tire pressure, and is in the nature of an improvement upon the joint application filed by myself and Michael A. Kennedy in the United States Patent Office August 8, 1925.

The object of the present improvement is to provide the type of pressure gauge described in the application and characterized by a tubular diaphragm of inelastic but pliable material, constructed and arranged to have movement in an endwise direction only to actuate a suitable pressure indicator in correspondence with the air pressure within the tire. The present improvement, instead of using an air-trapping valve for confining the air within the casing or diaphragm chamber, employs a pressure indicator device actuated in one direction only by the diaphragm so that the diaphragm, when retracting to initial position, after removal of the gauge from the tire stem, does not disturb the setting or indicating position of the indicator mechanism to adapt it to return to its initial position after the diaphragm has been restored to inital position and the reading of the indicator has been noted.

Heretofore it has been proposed, in certain types of gauges, to use a ratchet and pawl construction in conjunction with a Bourdon tube as a pressure-responsive member for actuating a pointer for retaining it in pressure indicating position, but in practice such devices are found to be so delicate that they will not maintain their accuracy after being tossed about and tumbled over in any automobile tool kit for a short period. Moreover, to get any fine calibration of the pressure, such as is desired for balloon tires where it is desired to register readably and accurately differences of only a pound pressure, the ratchet wheel must be made with such fine teeth that it is easy for the pawl to become disengaged. Other types of gauges making use of a distensible elastic tube, or of a closely packed air piston, are too inaccurate to indicate the slight variations in pressure required for testing balloon tires.

With a view to meeting these practical difficulties in the art the present improvement has been devised which consists, generally speaking, in a combination with a hollow casing adapted to be applied to the valve stem of a pneumatic tire, and having a tubular diaphragm of pliable air-tight fabric constructed and arranged to be movable in an endwise direction only in complete response to variations in air pressure, a movable rack member actuated by said endwise movement of the diaphragm, said rack member having constant intermeshing engagement with a pinion which actuates a dial indicator, the rack and pinion being movable by the diaphragm in one direction only, and being returnable to initial position after the diaphragm has retracted from pressure-indicating position.

These and other features of the invention will be described in the following specification and will be defined in the claims hereto annexed.

In the accompanying drawings I have illustrated two forms of construction and arrangement embodying the principles of this invention, in which:

Figure 1 is a rear elevation of a pressure gauge, the casing being partly cut away to expose the interior of the indicator mechanism.

Figure 2 is a central section taken at a plane at right angles to the plane of Figure 1 showing the relation of the collapsible diaphragm to the indicator mechanism.

Figure 3 is a view similar to Figure 2 showing a modified construction and arrangement of diaphragm and indicating mechanism.

Figure 4 is a view similar to Figure 1 of the same modification showing the indicator mechanism and special means for returning it to initial position after use.

Having reference particularly to the form shown in Figures 1 and 2, I have shown a hollow casing 1 provided with an air inlet passage 2, leading from the connecting nipple or pressure seat 3 which is adapted to be pressed upon the open end of the valve stem to unseat the valve and allow communication between the interior of the tire and the interior of the gauge casing, in a well known manner.

The end of the casing opposite to the inlet port is normally closed by a threaded cap 4 tightly screwed upon the open end portion of the casing, and in this case, pinching between itself and the casing, a peripheral flange 12 of a tubular diaphragm 11 having a closed end 13, and having its peripheral wall formed in annular folds or convolutions to render it extensible and contractible in an endwise direction without the necessity of making the diaphragm of elastic or stretchable material. Obviously the air pressure in the casing applied to the whole exterior surface of the diaphragm member would tend to collapse it in all directions which would impair its sensitiveness and practical utility for the purpose intended. Therefore, as in the former application noted above, there is provided a series of loose separate supporting rings 15 whose peripheral faces are concave to engage and support against collapse the inwardly turned folds of the tubular wall. A narrower series of rings 16, inserted inside the concave folds of the diaphragm, serve to support the outwardly turned folds thereof against collapsing movement.

The casing cap 4 is provided with a tubular extension 4ª which projects into a flat circular casing 6 containing the indicator mechanism. This casing is provided with a transparent front plate 7 and an interior dial plate 8 over which is moved the pressure-indicating dial pointer 9, which is actuated by the devices now to be described.

Inside of the tubular extension 4ª is located a two-part plunger comprising an outer sleeve 20 and an inner member in the form of a rod 21, screw-threaded at its lower end, and having adjustable connection with the sleeve 20 by means of an adjustable externally and internally threaded nut 22. The pitch of the screw threads at the lower end of the rod 21 and of the internal threads at the lower end of the sleeve 20 are identical so that the nut may be screwed upward on the rod to adjust the tension of the resistance spring 24 without varying the relative positions of the rod 21 and the sleeve 20 when both of these members are held against turning. On the other hand, the sleeve 20 may be turned while the nut is held against turning to lengthen or shorten the effective length of this compound plunger in order to make proper adjustment of the dial pointer without changing the spring tension.

The plunger 21 actuates the rotatable arbor 10 of the dial indicator, not by direct engagement, but by means of an intermediate rack member which, in this case, is shown as a reciprocatory rack-bar 25 whose teeth intermesh with a pinion 10ª on the arbor or shaft 10, and whose lower end has bearing engagement inside a flanged thrust sleeve 26, which forms a bearing guide for the upper end of the plunger rod 21 and the lower end of the rack-bar member 25 to preserve their alignment with each other and prevent either of their adjacent ends from being caught against the helical resistance spring 24.

The plunger rod 21 is slabbed off on the right hand side, as shown in Figure 2, to prevent any vacuum suction on the rack-bar plunger when the plunger 21 is retracted. It will be understood that the plunger 21 acts purely as a pusher or thrust actuator, and as soon as the connection with the interior tire is broken, allows the confined air in the casing to escape through the port 3 so that the diaphragm is returned to initial position by the resistance spring 24. This leaves the rack member 25, which is permanently in mesh with the indicator-actuating pinion 10, stationary in the positions to which they have been moved by the thrust of the movable pressure-responsive diaphragm.

As the rack element is of light construction I prefer to add to its weight somewhat, and this is done in the form shown by means of an attached weight 26ª forming, to all practical intents, a part of the rack member so that, by a sudden jerk or blow in an endwise direction, the rack-bar may return to its initial position after the diaphragm has retracted to its initial position. A guide-screw 27 may be secured in the casing extension 4ª with its inner end projecting into a slot in the sleeve 20 to prevent creeping or accidental rotation of the sleeve, and limit the endwise movement of the sleeve induced by the counter-balancing action of the air and spring.

To give a slight frictional resistance that will be insufficient to impair the practical accuracy of the device, while at the same time preventing the accidental return movement of the rack-bar member if it becomes loose in its bearing sleeve, I provide a spring-pressed ball 25ª mounted in a recess in the lower end of the rack-bar to frictionally engage the sleeve 26 with a light pressure.

In the alternative embodiment of the invention shown in Figures 3 and 4, the lower part of the casing which is applied to the valve stem of the tire has the same construction as that above described. In this case, however, the cap 30, applied to the outer end by a screw-threaded connection, is much deeper and forms the main part of the diaphragm or air-confining chamber, and the diaphragm proper 11 is of the same construction as that previously described, having the outwardly projecting attaching flange 12 and the closed end 13. In this case, however, as the air pressure is introduced inside of the tubular diaphragm, instead of on the outside, the tendency will be for the diaphragm to expand in every direction. Therefore, supporting rings 15ª are placed around the outside of the outward folds or convolutions to confine the convex surfaces of the folds, while the inward folds, at their exterior concave surfaces, are held against lateral displacement by means of the rings 16ª.

Over the closed end of the diaphragm, is placed a flat thrust disk 17, which is prevented from lateral displacement by the topmost ring 15ª. On this thrust plate 17 rests a compound plunger comprising the sleeve 20 and the internal rod 21 with the tensioning thrust nut 22, just as above described, which supports the counterbalancing thrust of the spring 24, all mounted within the upward tubular extension 31 of the cap portion 30 of the casing. This tubular member 31 is vertically slotted on one side and provided with a pair of spaced projecting ears 32 through which is passed a rotatable pin 33, to which is secured a rack element 34 of sector shape whose arcuate series of teeth constantly intermesh with the pinion 10ª on the arbor 10, which carries the dial indicator pointer 9, as above described.

This sector-shaped rack element is formed to engage the upper end of the pressure-responsive plunger 21 so that when the plunger moves upward the rack-element is also moved upward, rotating the pinion according to the travel of the plunger-rod 21 which is proportionate to the pressure exerted against the endwise movable diaphragm. If desired frictional retardation, similar to that already described, may be provided by a set-screw 35 pressing a small spring against one end of the indicator arbor 10 to give a slight friction thereon.

The rack and pinion elements may be returned to initial position by means of a pivotally connected bar 36 carrying a weight 37, secured at a proper distance from the bearing portion 38 of the casing 40 to prevent the rack from being accidentally moved out of intermeshing relation to the pinion. This stop member 37 also may serve as a weight for restoring the indicator parts to initial position, and at the same time, as shown in the drawings, the rod is projected far enough outside of the casing to permit initial pressure thereon by the finger to restore it to initial position.

In both forms illustrated the action is effected through a diaphragm element that, unlike a tight-fitting piston, is substantially free from friction and absolutely free from leakage so as to make it very sensitive to changes in pressure, while leaving nothing to get out of order, and it is not affected, as stretchable elastic diaphragms are, by change in condition of the distensible rubber. At the same time the indicator portion of the mechanism is completely responsive to slight endwise movement of the diaphragm which it indicates on a greatly enlarged scale so as to afford easy reading of small variations in pressure, which is particularly desirable in the case of a tire pressure gauge for balloon tires. The slight frictional retardation of the indicator mechanism is altogether too small to impair the accuracy of the indicator, while being entirely adequate to preserve the pressure indication until it is read. The adjustment provisions are such that the tensioning of the spring to afford the proper counterbalancing resistance may be effected, and the proper correspondence between the dial reading and the actual pressure may be brought about with the greatest accuracy. Both the pressure-responsive diaphragm and the transmission mechanism for actuating the dial indicator are of such construction that there is nothing to get out of order under the rather rough handling to which such devices are commonly subjected.

What I claim is:

1. In a pressure gauge for testing pneumatic tires, the combination with a hollow casing provided with an air inlet to admit compressed air, an air-confining tubular diaphragm of pliable air-tight fabric formed with annular convolutions and a closed end wall, the open end of said diaphragm being secured inside the casing to expose its interior to the air admitted into the casing, external means engaging the exterior convex and concave faces of the convolutions to prevent lateral expansion under internal pressure, while leaving the end wall free to move endwise against a counter-balancing resistance, and pressure indicator devices actuated by the endwise movement of the diaphragm to indicate the different pressures to which the diaphragm is subjected.

2. In a pressure gauge for testing pneumatic tires, the combination with a hollow casing provided with an air inlet passage, of an air-confining tubular diaphragm of pliable air-tight fabric formed with a closed end wall and having annular convolutions to permit expansion and contraction in an endwise direction, separate external confining members engaging the convex and the concave surfaces of the annular convolutions to prevent lateral expansion, a dial pressure indicator, a movable actuator moved in one direction only in correspondence with the endwise movement of the diaphragm, and means by which the indicator may be returned at will to initial position after the diaphragm has retracted.

3. In a tire pressure gauge, the combination of a pressure responsive tubular diaphragm movable in an endwise direction only against a counterbalancing spring, a dial-pressure indicator, a spring-resisted plunger adjustable as to length opposing a yielding resistance to the endwise pressure-induced movement of the diaphragm, a toothed rack member movable outwardly by the movement of said plunger and having continuous operative connection with the dial-indicator to move it to and from pressure-indicating position, and means for returning said rack member and indicator to initial position independently of the return movement of the diaphragm.

4. In a tire pressure gauge, the combination of a spring-resisted endwise movable air-confining tubular diaphragm, a rack member arranged to be pushed outwardly by the endwise movement of the diaphragm and returnable to initial position independently of the diaphragm, a dial-pressure indicator operatively connected with said rack member to be moved thereby in both directions through an intermeshing pinion, and means for preventing movement of the rack member out of engagement with the pinion and for effecting the return of the rack member and the indicator to initial position.

5. In a tire pressure gauge, the combination of an endwise movable air-actuated spring-resisted diaphragm, a dial pressure indicator, an indicator actuator having movement responsive to the endwise movement of the diaphragm in one direction only, and having rack and pinion connection with the pressure indicator, and means for exerting a slight but constant retarding friction on the rack member to prevent accidental movement of the rack member.

6. In a tire pressure gauge, the combination with a pressure-responsive diaphragm movable against a counterbalancing spring resistance, a rack and pinion actuated dial pressure indicator, and means intermediate of the diaphragm and the indicator for varying the relationship between the diaphragm and the indicator to effect accurate correspondence between the pressure-responsive position of the diaphragm and the pressure indicator, while preserving the intermeshing relation between the rack and pinion.

In witness whereof, I have subscribed the above specification.

JOHN E. KENNEDY.